United States Patent

[11] 3,601,375

| [72] | Inventor | Edward W. Bowman |
| | | 279 Derrick Ave., Uniontown, Pa. 15401 |
| [21] | Appl. No. | 818,225 |
| [22] | Filed | Apr. 22, 1969 |
| [45] | Patented | Aug. 24, 1971 |

[54] GLASS ANNEALING LEHRS
5 Claims, 9 Drawing Figs.

| [52] | U.S. Cl. | 263/8 |
| [51] | Int. Cl. | F27b 9/24 |
| [50] | Field of Search | 263/8; 214/21 |

[56] References Cited
UNITED STATES PATENTS

| 2,713,480 | 7/1955 | Ruckstahl | 263/8 |
| 3,378,243 | 4/1968 | Morton | 263/8 |
| 3,439,906 | 4/1969 | Gerrish | 263/8 |
| 3,463,465 | 8/1969 | Fuller | 263/8 |

*Primary Examiner*—Edward G. Favors
*Attorney*—William B. Jaspert

ABSTRACT: A glass annealing lehr constructed to direct the heating medium of different temperatures to separately controlled successive zones of the annealing tunnel through which the ware passes in traveling from the charge to the discharge end. The lehr also features the use of continuous conveying means on which the ware is supported to pass through the annealing tunnel in a single line whereby each unit of ware is subjected to uniform treatment in its passage through the lehr.

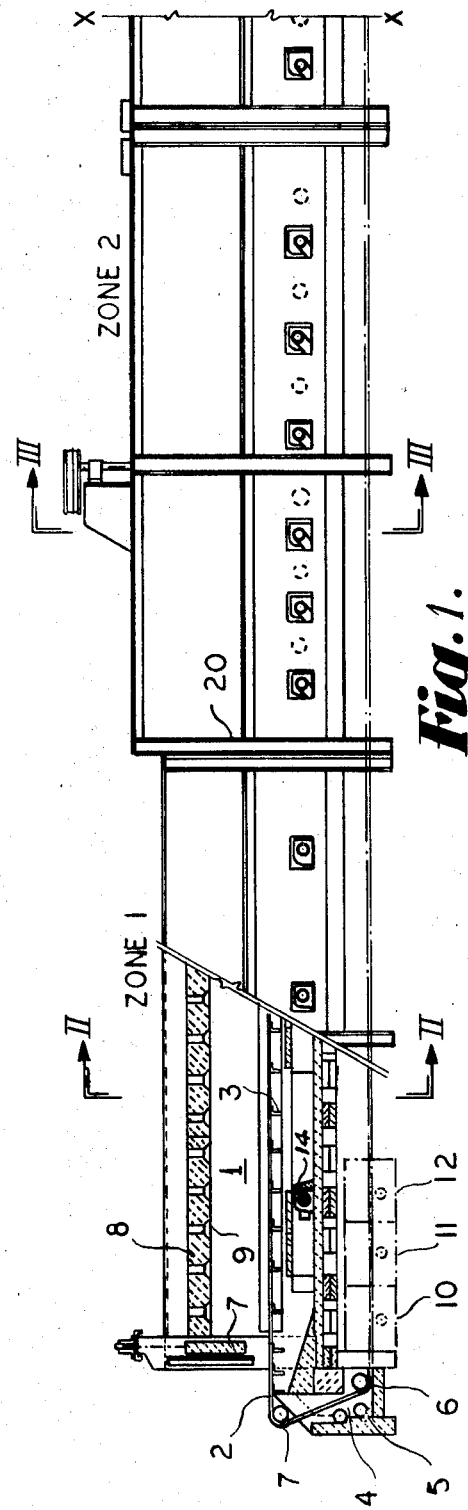
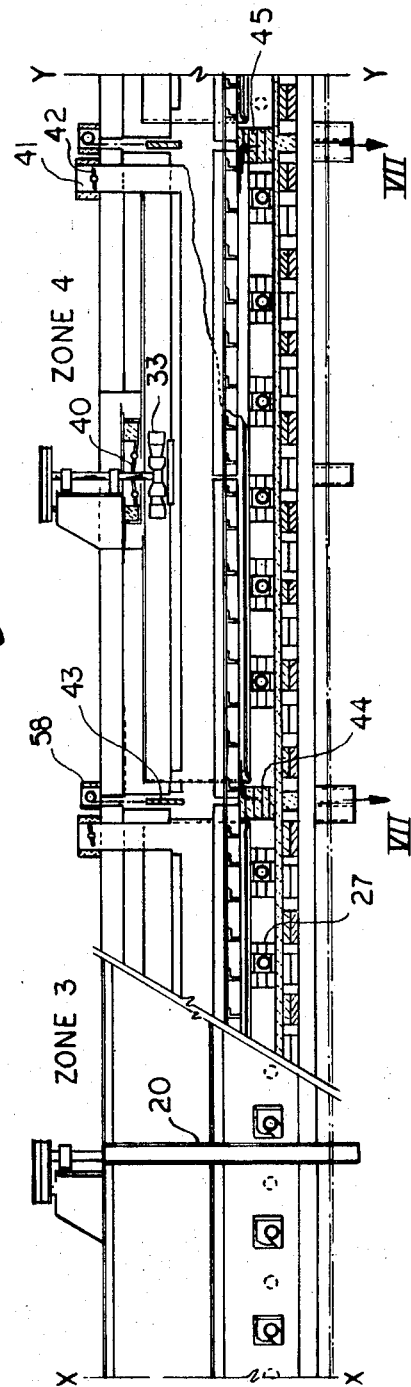

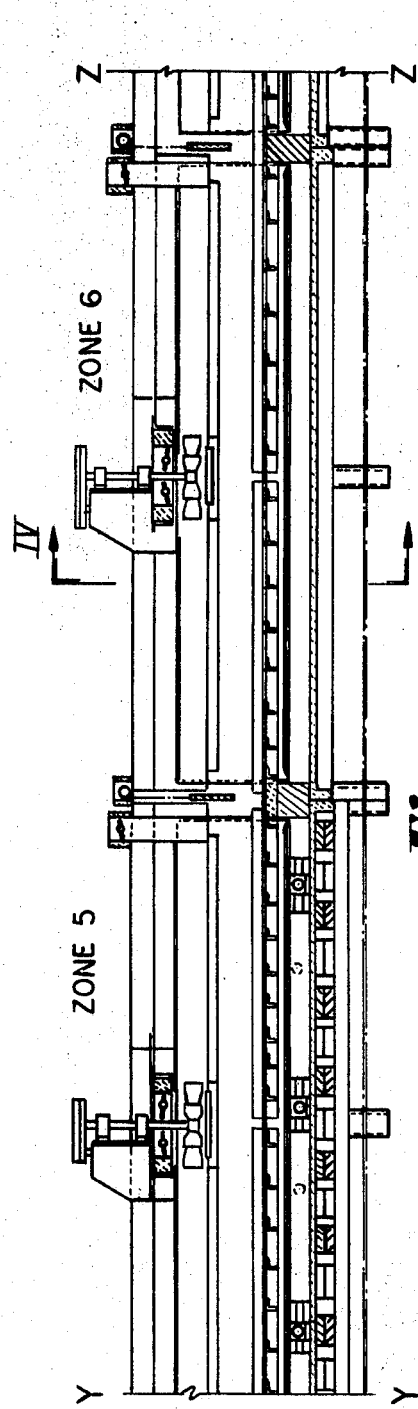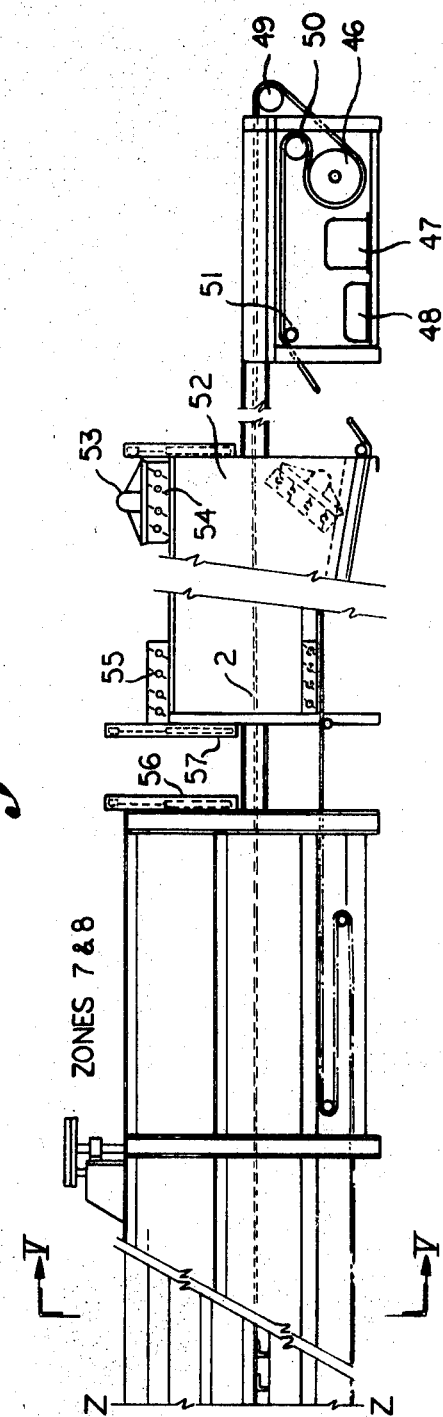

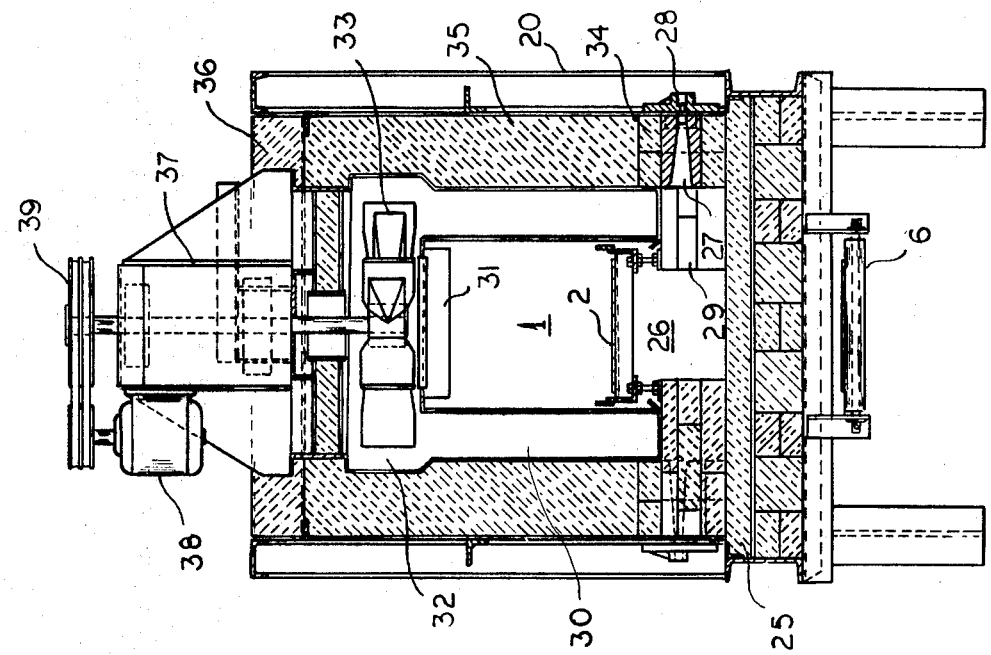
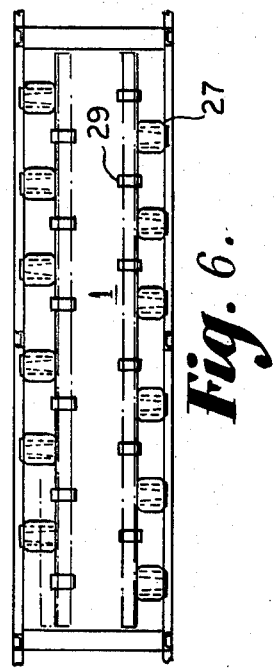
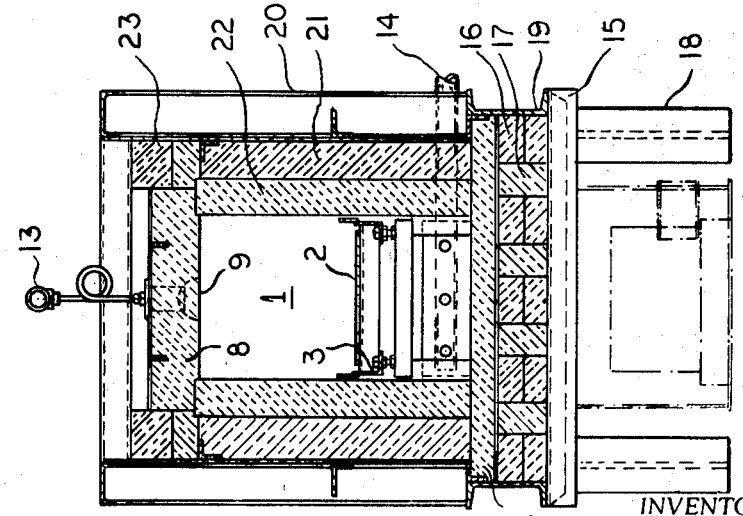

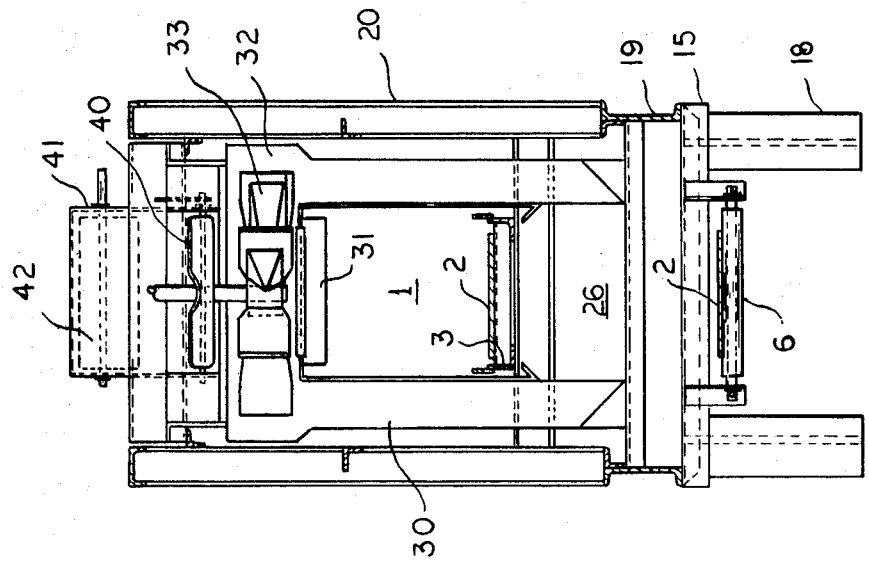
Fig. 5. ZONES 7 & 8.
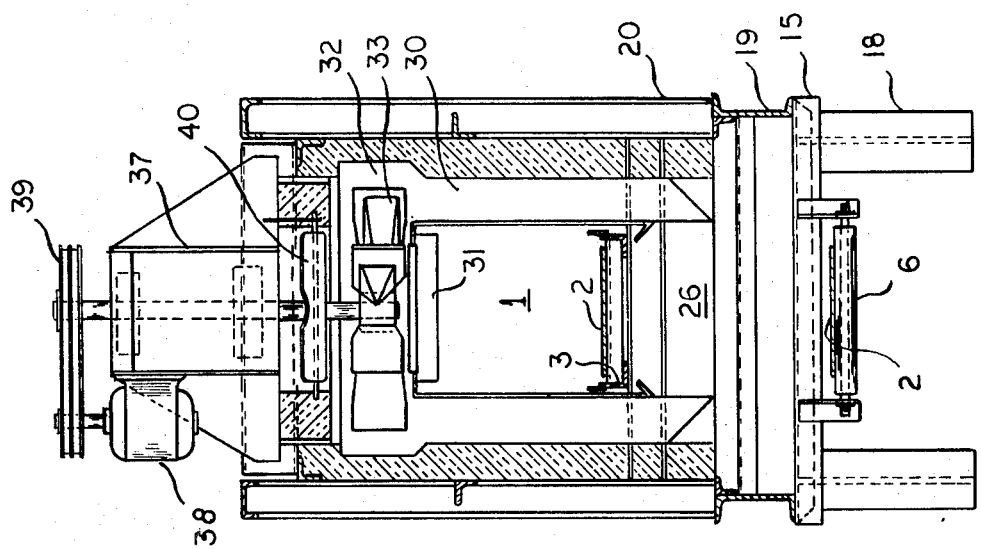
Fig. 4. ZONE 6.
INVENTOR.
EDWARD W. BOWMAN
BY William D. Jaspert
Attorney.

GLASS ANNEALING LEHRS

BACKGROUND OF THE INVENTION

This invention is in the field of annealing glassware involving an apparatus for selectively applying heat to glassware in a manner to subject it to uniform annealing temperatures in a minimum time. Obviously, the annealing apparatus and method may be usable in annealing or heat treating other materials than glassware.

DESCRIPTION OF THE PRIOR ART

Until recently, conventional glass annealing lehrs utilized wire mesh, endless conveyor belts in which the ware such as bottles were stacked in transverse rows so that each unit of ware in a given row would be subjected to temperatures prevailing in the area through which it was being conveyed. The heating systems in these lehrs, subjected the ware, passing through it initially to a heating up temperature and then to a gradually reducing temperature until the ware had been exposed to the proper temperature gradient to release the strains imposed in the formation of the ware after which it is subject to rapid cooling.

These temperature controls were effected by regulating the application of heat at the bottom of the lehr through flues and burners that could be regulated along the length of the lehr and by utilizing dampers in the roof of the lehr, heat could be radiated or withdrawn. The first attempt at zonal control was described in U.S. Pat. No. 3,010,710 granted to me Nov. 28, 1961. While this patent disclosed vertically adjustable partitions dividing the lehr into successive zones, the heat was provided at the bottom only and it was not recirculated as in the present invention. The feature of rapidly cooling the ware at the discharged end of the lehr as herein described, is covered by U.S. Pat. No. 3,371,430 granted to me Mar. 5, 1968, and means for preheating the conveyor at the charging end of the furnace is shown and described in my copending application Ser. No. 782,514, filed Dec. 4, 1968.

SUMMARY OF THE INVENTION

This invention is directed to zonal lehrs of tunnel shape operating speeds from 44 to 156 inches per minute depending upon the various sizes and kind of lehrs. The lehr is made up of 10 zones more or less with the temperature of each zone being separately controlled by the method of firing into a heating chamber and regulating the temperature by drawing in air and balancing furnace pressure.

BRIEF DESCRIPTION OF THE DRAWING

FIG. 1 is a side elevational view partially in vertical section of the charging end of the glass annealing lehr embodying the principals of this invention.

FIG. 1a is a vertical section partially in elevation forming an extension of FIG. 1 as indicated by the lines X—X of FIGS. 1 and 1a;

FIG. 1b is a vertical cross section partially in elevation forming an extension of FIG. 1a as indicated by the lines Y—Y of FIGS. 1a and 1b;

FIG. 1c is a vertical section partially in elevation of the discharge end of the lehr forming an extension as indicated by the lines Z—Z of FIGS. 1b and 1c;

FIG. 2 is a transverse section taken along the line 2—2 of FIG. 1;

FIG. 3 is a similar view taken along the line 3—3 of FIG. 1;

FIG. 4 is a similar view taken along the line 4—4 of FIG. 1b;

FIG. 5 is a similar view taken along the line 5—5 of FIG. 1c; and

FIG. 6 is a top plan view taken along the line 6—6 of FIG. 1a.

For clarification it is pointed out that the several views are designated by zonal numbers ranging from 1 through 8.

DESCRIPTION OF THE PREFERRED EMBODIMENT

Referring to the drawings, FIG. 1, 1a and 1c when placed end to end as stated in the brief description of the drawings, constitutes the entire lehr from the charge to the discharge end preheating, heating or firing and cooling sections. The charging end which is designated as zone 1 in FIG. 1 of the drawing, shows the annealing chamber which is designated by the reference character 1 through which an endless conveyor 2 passes over skid angles 3. The front end of the lehr is provided with a heating chamber 4 utilizing line burners 5 for preheating the endless conveyor belt passing between either pulleys 6 and 7. A door 7 controls the opening to the heating chamber and a fire brick roof 8 having radiant cup burners 9 is provided in zone 1 for additional heating, the conveyor and the ware supported thereon passes through the heating chamber 1 into zone 2 which will be hereafter described.

The conveyor belt 2 may additionally be heated by bottom heaters 10, 11 and 12 to bring the conveyor belt up to desired temperature, the use of the bottom heaters and the number in use being dependent upon the rate of travel of the conveyor belt.

With reference to FIG. 1 the fuel line manifold 13 connects the burners 9 and a burner manifold 14 supplies heat to the bottom of the heating chamber 1. The lehr structure is built upon a steel bottom plate 15 having fire brick peers 16 with rock wool insulation 17 disposed therebetween. The steel plate 15 is supported on the superstructure of steel uprights 18, channels 19 and buck-stays 20. The cross section along the line 2—2 of FIG. 2 further discloses a refractory brick wall 21 having an inner liner 22 of a castable insulating material. Rock wool insulation 23 is provided above the wall 21.

With reference to FIG. 3 of the drawing, which is taken along the line 3—3 in zone 2, FIG. 1. The conveyor belt in the annealing chamber 1 is shown as being spaced above the floor 25 to form a heating chamber designated by the reference numeral 26. Burner ports 27 are spaced along the sidewall of the lehr and are provided with burners 28. The ports on opposite sidewalls are staggered and brick piers 29 are provided adjacent or between the burner ports 27 to prevent stratification of the hot gases longitudinally of the lehr. It will be noted that that the brick piers 29 support the skid frames 3 for the conveyor belt 2. As shown in FIG. 3 steel downducts 30 are provided, through which the heated gases of the annealing chamber 1 are drawn from the return duct 31 at the top of the annealing chamber. The downducts 30 being connected by a crossduct 32 in which a fan 33 is disposed to set up forced circulation whereby heat is withdrawn from the annealing chamber 1 and forces downducts 30 back into the heating chamber 26. The sidewalls of the lehr as shown in FIG. 3 consist of fire brick 34 and rock wool insulation 35. Mounted on the roof 36 is a fan motor assembly generally designated by the numeral 37 driven by a motor 38 through belt driven pulleys 39.

FIG. 6 diagrammatically illustrates the arrangement of the burner ports 27 and the brick peers 29 on opposite sides of the annealing chamber 1. With reference to FIG. 4 of the drawing a damper 40 is shown for admitting atmospheric air to the crossduct 32 and return or downducts 30 respectively. These dampers are shown in FIG. 1a as provided in pairs. Also in FIG. 1a is shown an exhaust flue 41 having a damper 42 by means of which pressure in the annealing chamber can be regulated through the escape of the accumulated gases in the annealing chamber. Furnace pressure is further regulated by the gates or vertically adjustable partitions 43. Partition walls are provided as shown at 44 and 45 to prevent heat passing from zone to zone through the bottom heating chamber 26.

In operation the conveyor belt 2 is preheated by the bottom burners 10, 11 and 12 and burners 4 and 5 at the front or charging end of the lehr.

The heating of zone 1 is augmented by the radiant cup burners 9 in the top panel or roof 8. The bottom burners supply additional heat to the annealing chamber 1 for heating the ware as it comes from the forming machines when it is placed on the charging end of the conveyor belt.

The conveyor belt 2 is driven by a belt drive consisting of a drive drum 46 driven through a gear reduction unit 47 by a motor 48 over guide pulleys 49, 50 and 51, at the discharge end of the lehr. The ware on belt 2 passes through a cooling chamber designated by the numeral 52 for rapidly cooling the ware and to which cooling air is delivered by a blower 53 through adjustable dampers 54. Dampers 55 are provided to further permit the escape of warm air from the cooling chamber.

Doors 56 and 57 permit the escape of warm air from the cooling chambers.

Doors 56 and 57 permit the escape of air from the lehr chamber and the rapid cooling chamber to the atmosphere. This construction being more clearly described in my U.S. Pat. No. 3,371,430.

The same floor construction is used in zones 2 to 5 as is used in zone 1. As the fuel is supplied through the burners 28 the fan motor assembly 37 draws the heated air from the bottom heating chamber 26 through the lehr conveyor belt into the annealing chamber 1, and is recirculated from the crossduct the return downducts 30 and again upward through the conveyor belt to the annealing chamber of the lehr. If additional cooling air is needed dampers 40 open automatically to provide the required amount and dampers 42 are set manually to provide the required volume and pressure of heating the heating medium in the annealing chamber 1. In other words as the pressures vary in the annealing chamber manipulation of dampers 42 will automatically respond to provide the desired temperature and pressure inside of the annealing chamber. The exhaust flues 41 expel excessive hot air when operated to equalize chamber pressures.

The gate or adjustable partition, member 43, is operated through a control system 58 so that the intake dampers 40 will open when the gates 43 are opened to further maintain the proper operating atmosphere within the several zones.

The operation in zones 6, 7 and 8 is the same as in the other ones except that in the last three zones, cooling air is introduced and waste heated air is expelled in order to cool the ware rapidly. There are no burners in these zones.

In each of the zones the baffle doors 43 provide a definite separation between zones. In conjunction with the automatic recirculation and control system it is possible to set and hold any desired temperature within each zone. Uniformity of heat treatment is assured by the accurate control possible and by the fact that each piece of ware goes through identical cycling inside the single line lehr.

Although one embodiment of the invention has been herein shown and described it will be made evident that various modifications may be made in the details of construction without departing from the principles herein set forth.

I claim:

1. An industrial heating furnace having,
   a tunnel shaped chamber comprising preheating, heating, and cooling zones having an endless conveyor extending the full length thereof dividing said chamber into a heating chamber beneath the conveyor and an annealing chamber above the conveyor,
   burners having burner ports extending through opposite walls below the conveyor,
   refractory piers between said burner ports constituting supports for said conveyor and preventing the stratification and flow of the heating medium longitudinally of the furnace chamber,
   adjustable baffle doors suspended from the roof of the tunnel to divide the annealing chamber into separately controllable heating zones,
   circulating fans at the top of the annealing chambers in the respective zones and ducts extending adjacent the sidewalls of the annealing chamber extending below the conveyor,
   said ducts being open at the bottom and being cross connected by a passage around said circulating fans at the top,
   said passage communicating with the top of the annealing chamber,
   and air inlet above the fan having dampers for regulating the volume of air drawn into the circulating ducts of the annealing chambers and,
   said divided zones being provided with an exhaust passage having a damper for regulating the escape of the air and control the pressure of the heating medium in the several temperature zones.

2. An industrial heating furnace as set forth in claim 1 in which,
   the fans and dampers of the several heating zones are separately controllable.

3. An industrial heating furnace as set forth in claim 1 in which,
   the conveyor is preheated before entering the annealing chamber.

4. An industrial heating furnace as set forth in claim 1 in which,
   the cooling zones are controlled by forced circulation of atmospheric air and the exhaust of the heating medium.

5. An industrial heating furnace as set forth in claim 1 in which,
   the conveyor is of narrow width for supporting a single line of ware in its passage through the tunnel.